US005230132A

United States Patent [19]

Chou

[11] Patent Number: 5,230,132

[45] Date of Patent: Jul. 27, 1993

[54] METHOD OF USE FOR A MULTIPLE BOND SIZING AND REPAIRING DEVICE

[75] Inventor: Scott M. S. Chou, Paramus, N.J.

[73] Assignee: Kabushiki Kaisha Hattori Seiko, Tokyo, Japan

[21] Appl. No.: 916,434

[22] Filed: Jul. 21, 1992

Related U.S. Application Data

[62] Division of Ser. No. 770,805, Oct. 4, 1991, Pat. No. 5,208,929.

[51] Int. Cl.[5] ............ B23P 6/00

[52] U.S. Cl. ............ 29/402.08; 29/426.5

[58] Field of Search ............ 29/402.03, 402.08, 426.1, 29/426.5, 525.1, 434, 436; 7/101

[56] References Cited

U.S. PATENT DOCUMENTS

| | | | |
|---|---|---|---|
| 2,672,775 | 3/1954 | Koski | 59/7 |
| 2,826,893 | 3/1958 | Falk et al. | 59/7 |
| 2,904,955 | 9/1959 | Kreiter | 59/7 |
| 3,689,056 | 9/1972 | Wilten | 269/10 |
| 3,899,162 | 8/1975 | Fischer | 269/25 |
| 4,008,632 | 2/1977 | Denney | 29/271 |
| 4,030,286 | 6/1977 | Gibilaro | 59/7 |
| 4,043,547 | 8/1977 | Glomb et al. | 269/136 |
| 4,186,916 | 2/1980 | Varga | 269/303 |
| 4,500,079 | 2/1985 | Morghen | 269/47 |
| 4,506,501 | 3/1985 | DeVall et al. | 57/7 |

FOREIGN PATENT DOCUMENTS

| | | |
|---|---|---|
| WO82/00967 | 4/1982 | European Pat. Off. . |
| 0263476 | 10/1987 | European Pat. Off. . |
| 2136727 | 9/1984 | United Kingdom . |
| 2144062 | 2/1985 | United Kingdom . |
| 2241182 | 8/1991 | United Kingdom . |

*Primary Examiner*—Timothy V. Eley

*Attorney, Agent, or Firm*—Blum Kaplan

[57] ABSTRACT

A multiple band sizing and repairing device is provided with a base and a plurality of blocks rising from the base for receiving and securing a watch band along its edge. The blocks are separated by varying distances from each other to form channels of varying widths therebetween to accommodate watch bands of varying thickness. A pair of shoulders extend from one side of the base and are separated from each other to form a gap therebetween. A passageway in each shoulder permits a pair of bolts to extend through the pair of shoulders. Upon rotation of the bolts, a vice is formed wherein the passageways guide movement of the bolts therethrough in applying pressure to a pin of the band. A hollow tip is provided at the inner end of at least one bolt so that the pin can be receivingly seated and held by the tip. Each block also includes a receptor for seating a bit therein. The bit serves as a screwdriver to engage and thereby prevent rotation of a screw connecting the band to a watchcase when otherwise operating on the band.

4 Claims, 7 Drawing Sheets

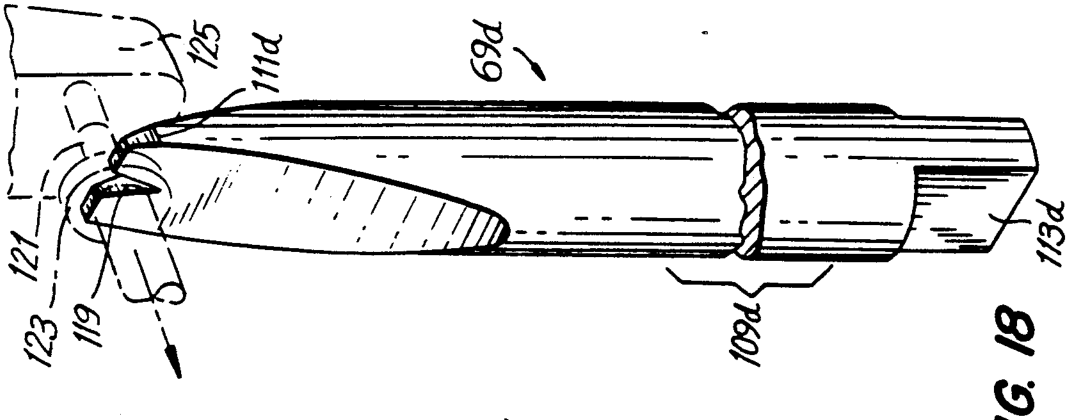
FIG. 18
FIG. 17
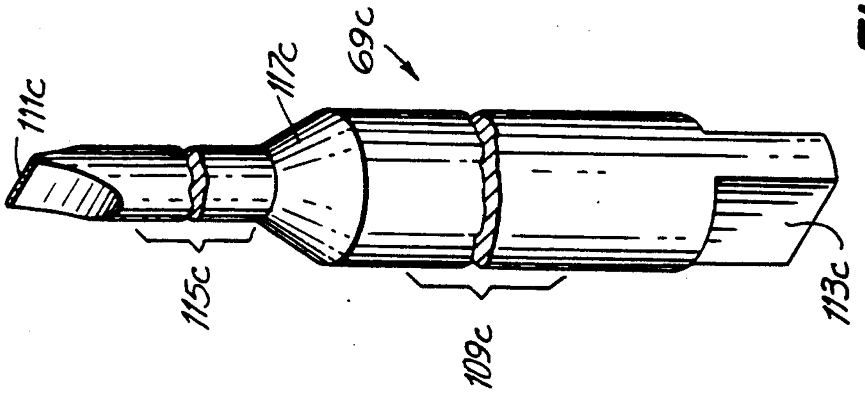
FIG. 16
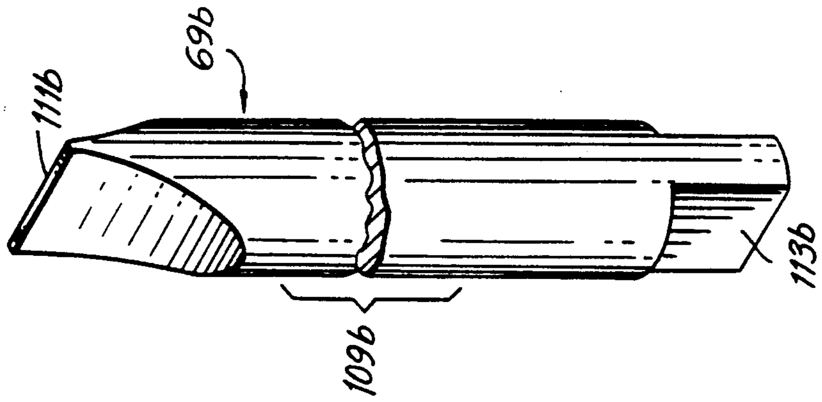
FIG. 15
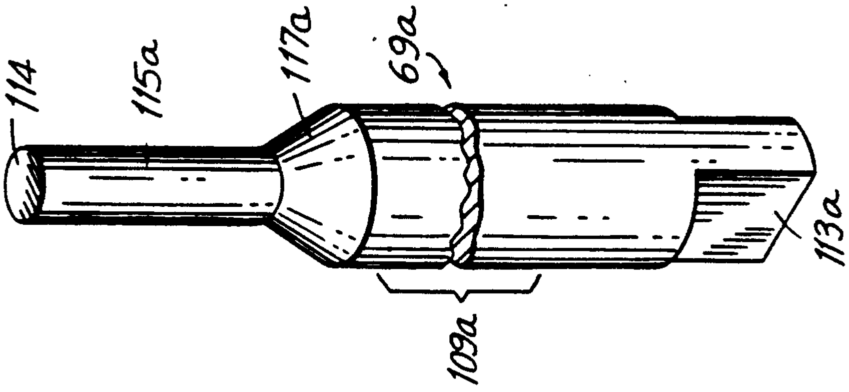

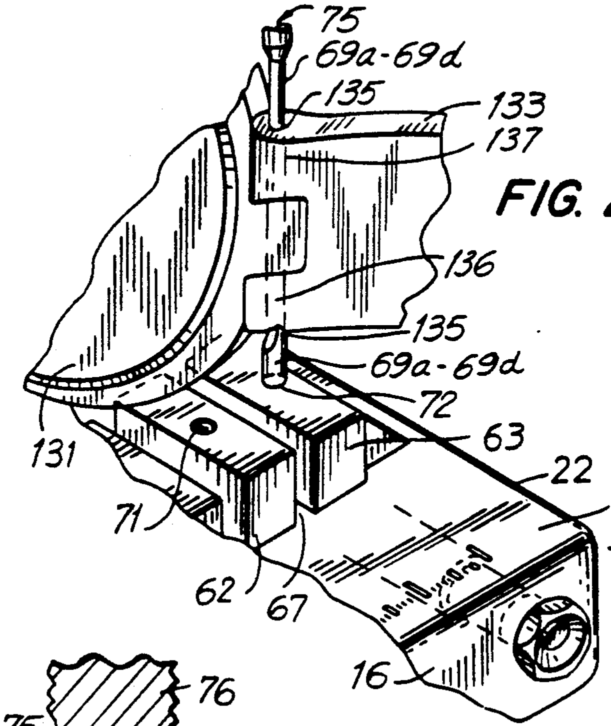
FIG. 22
FIG. 23
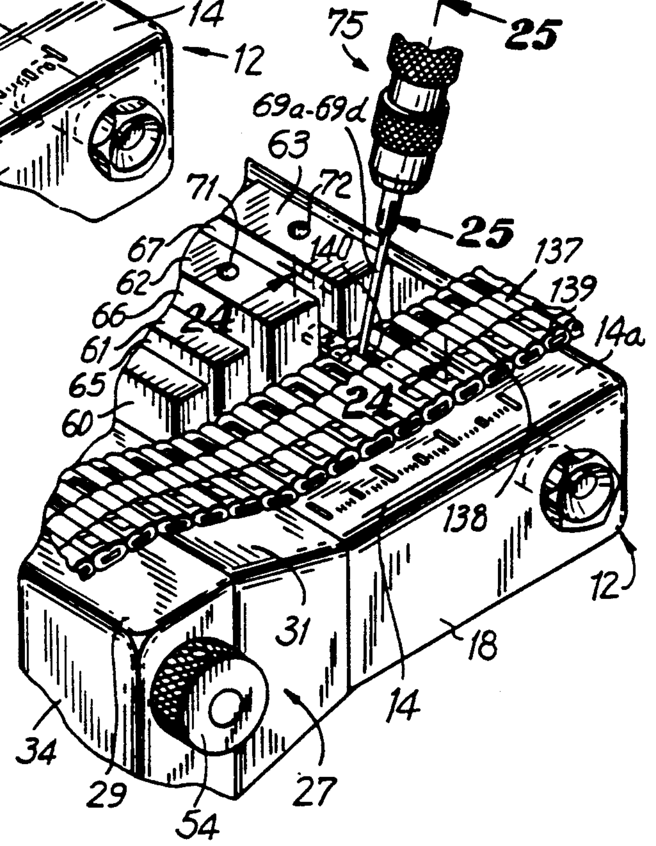
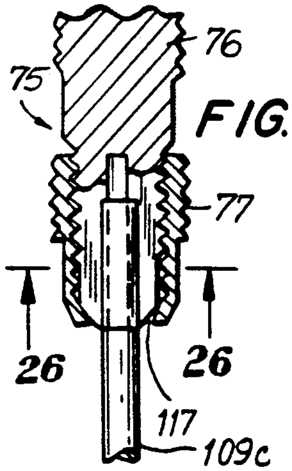
FIG. 25
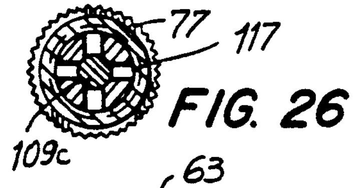
FIG. 26
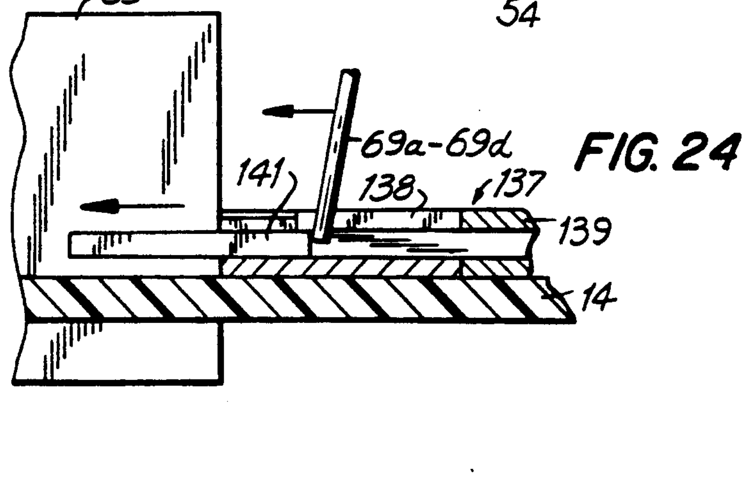
FIG. 24

METHOD OF USE FOR A MULTIPLE BOND SIZING AND REPAIRING DEVICE

This application is a division of application Ser. No. 07/770,805, filed Oct. 4, 1991, entitled MULTIPLE BAND SIZING AND REPAIRING DEVICE now U.S. Pat. No. 5,208,929.

BACKGROUND OF THE INVENTION

This invention relates to a device for sizing and repairing bands such as, but not limited to, watch bands and in particular to a multiple band sizing and repairing device for easily and quickly repairing and sizing bands having small parts.

Watchbands have become increasingly more diversified and complicated in both technology and construction. The technological advancements resulting in smaller parts have made insertion of pins and screwing of screws and removal of same in repairing and sizing of watchbands far more difficult. Retailers frequently refuse to buy products which include bands too awkward and/or complicated to repair and size.

In repairing and sizing a watchband, it is generally necessary to have a second individual present for holding the band in a stationary position when repairing and/or sizing the band (e.g., inserting or removing a pin and/or screwing or unscrewing a screw). Time which can be devoted to other activities such as selling of merchandise must be spent on time consuming repair and sizing of such watchbands. Similar problems are encountered in sizing and repairing chain links, bracelets, necklaces and the like having similar small parts.

Accordingly, it is desirable to provide a device which can quickly and easily facilitate the sizing and repairing of a band with minimal effort and manipulation. The device should provide a far simpler method for insertion of pins and screwing of screws and removal of same while maintaining the band in a stationary position. Preferably, the device should also require no additional tools and be of simple design and construction.

SUMMARY OF THE INVENTION

Generally speaking, in accordance with one aspect of the invention, a device for sizing and repairing a band includes a base and a plurality of blocks, coupled to the base, for receiving and inhibiting lateral movement of the band. The plurality of blocks are separated by varying distances from each other to form channels of varying widths. The plurality of blocks are generally rectangular of varying size. Such blocks are separated from each other to receive bands of varying thickness along their edges. Through use of this device sizing and repairing of a band is easily and efficiently accommodated since the band can be maintained in a stationary position along its edge.

In accordance with another aspect of the invention, the base includes a flat surface adjacent to the plurality of blocks. Each of the blocks includes a wall rising from the base to maintain the band in a stationary position when the band is placed on the flat surface. Consequently, a pin or the like in joining a pair of links of the band together can be removed from the band by exerting pressure from a screwdriver type instrument against the pin while maintaining the band in a stationary position. The band is placed on the flat surface abutting the blocks so that as the pin is forced from the links the pin enters one of the channels formed by the blocks.

In accordance with yet another aspect of the invention, a pressing mechanism, coupled to the base, is operable for applying pressure to a pin of the band for removing the pin from and for inserting the pin into the band. The pressing mechanism includes a first shoulder and a second shoulder coupling the pressing mechanism to the base. The shoulders are separated from each other so as to form a gap therebetween. Each shoulder includes a passageway for providing spacial communication through the shoulder. The passageways extend in the same direction.

The pressing mechanism also includes a first bolt and a second bolt for moving in linear reciprocating directions through the passageways of the first shoulder and the second shoulder, respectively. The shoulders serve to guide the bolts in applying pressure to a pin. The second bolt receives that portion of the pin which protrudes beyond the band as pressure is applied to the pin by the first bolt. The first bolt in moving in one of the linear reciprocating directions presses against the pin forcing the pin to enter and travel into the gap. The second bolt is operable for maintaining a stationary position within the gap for receiving the pin when pressure is applied to the pin by the first bolt.

In a preferred embodiment of the invention, each passageway includes an internal thread for mating with the corresponding bolt. Each bolt also preferably includes an adjustment knob at its distal end for controlling movement of the bolt.

In another feature of the invention, at least one of the bolts has a hollow tip for receiving that portion of the pin which protrudes beyond the band as pressure is applied to the pin.

In accordance with still another aspect of the invention, each of the blocks includes a receptor for detachably seating a protrusion therein. The protrusion is operable for engagement with and preventing rotation of a screw connecting the band to the watch case during repair and sizing of the band. The protrusion through engagement with the screw also inhibits lateral movement of the case when detaching or attaching the band to the watch.

In yet another feature of the invention, each protrusion includes on its exterior surface one of a male member and a female member and each receptor includes within its interior the other of the male member and female member for connecting the protrusion within each one of the receptors. The protrusion can be in the form of a flat head screwdriver or as a pin. When the protrusion serves as a pin, the protrusion can be operated for applying pressure in forcing a pin of the band from the latter. The protrusion typically has a cylindrical body.

In yet another aspect of the invention, the device also includes a screwdriver-type tool detachably couple to the base for operating on the screws and pins of the band.

Accordingly, it is an object of the present invention to provide a multiple band sizing and repairing device which can be easily and quickly manipulated for repair and sizing of a watchband.

It is another object of the invention is to provide a multiple band sizing and repairing device which is simple to operate and can be used without need of additional tools.

It is a further object of the invention is to provide a multiple band sizing and repairing device of simple design and construction which can be easily manufactured.

Still other objects and advantages of the invention will, in part, be obvious and will, in part, be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 15 is a perspective view of a bit in accordance with a seventh embodiment of the invention;

FIG. 16 is a perspective view of a bit in accordance with an eighth embodiment of the invention;

FIG. 17 is a perspective view of a bit in accordance with a ninth embodiment of the invention;

FIG. 18 is a perspective view of a bit in accordance with a tenth embodiment of the invention;

FIG. 22 is a fragmentary perspective view of the multiple band sizing and repairing device when removing a screw from a two screw band;

FIG. 23 is a fragmentary perspective view of the multiple band sizing and repairing device when removing a clip spring from a band;

FIG. 24 is a fragmentary cross-sectional view taken along lines 24—24 of FIG. 23;

FIG. 25 is a fragmentary cross-sectional view taken along lines 25—25 of FIG. 23; and FIG. 26 is a cross-sectional view taken along lines 26—26 of FIG. 25.

DETAILED DESCRIPTION OF THE PREFERRED EMBODIMENTS

Figure 1:
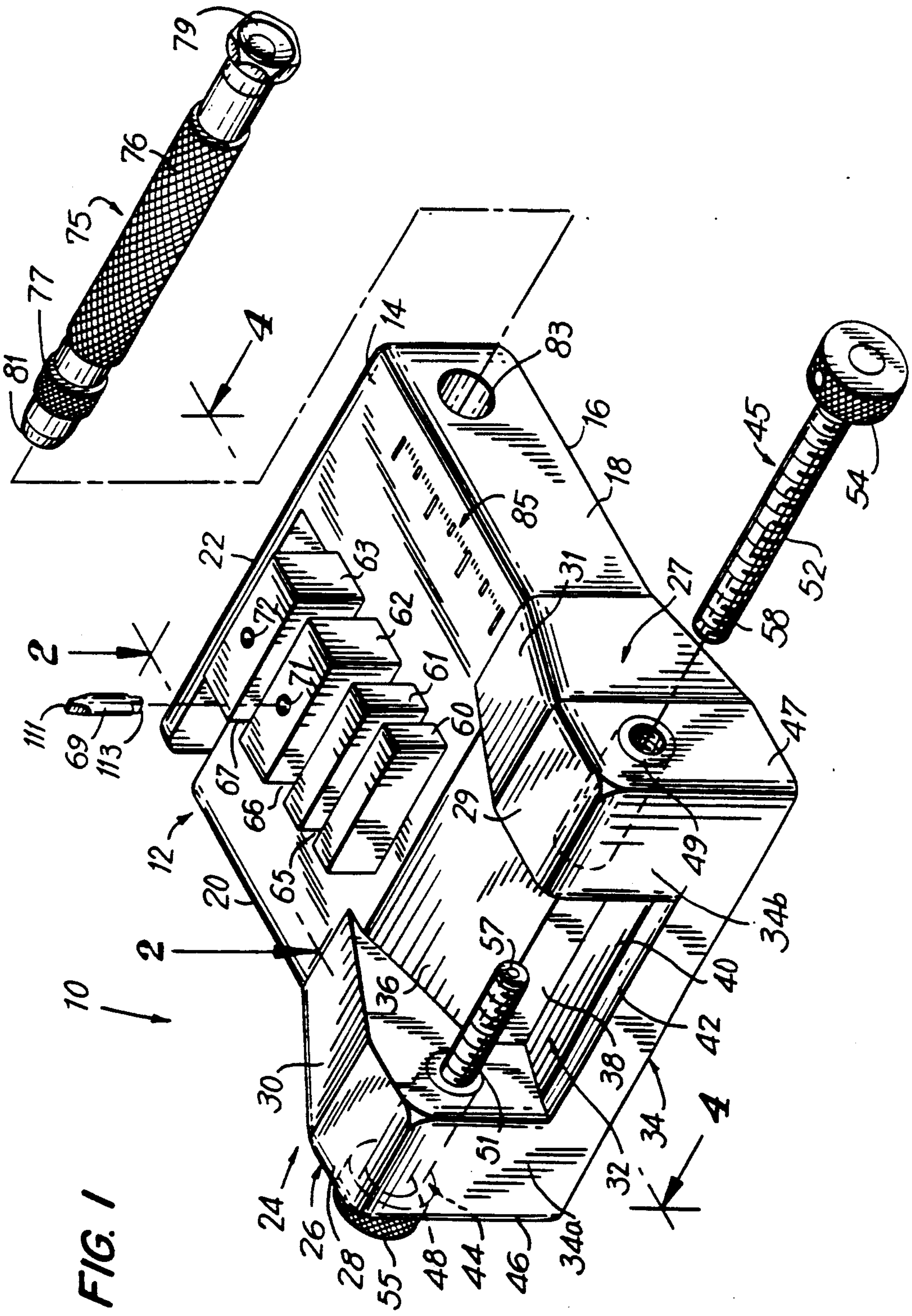
FIG. 1 is a partially exploded perspective view of a multiple band sizing and repairing device in accordance with the invention.

As shown in FIGS. 1–4, a multiple band sizing and repairing device 10, which can be used to repair a variety of different watchbands, chain links, bracelets, necklaces and the like, includes a base 12 and a presser mechanism 24.

Base 12 has a substantially rectangular block shape and includes a top portion 14, a bottom portion 16, a pair of side walls 18 and 20 and a back wall 22. The front wall of base 12 (not shown) is integrally connected to a pair of shoulders 26, 27 of a presser mechanism 24.

Shoulders 26, 27 include a pair of planar tops 28, 29 and gradually sloping inclines 30, 31 rising from top portion 14 of base 12 to planar tops 28, 29 respectively. The front portion of shoulders 26, 27 is defined by a wall 34. A gap 32 between shoulders 26, 27 serves as a work area for presser mechanism 24 and is defined by a gradually declining slanted wall 36 stopping at a vertical wall 38. Vertical wall 38 projects downwardly towards and meets a gradually rising sloped bottom 40. Slanted wall 36 and sloped bottom 40 are angled in opposite directions. Sloped bottom 40 leads to a horizontal bottom 42. Front wall 34, is substantially U-shaped, has a pair of legs 34a and 34b, is separated by gap 32, and rises upwardly to meet shoulders 26 and 27, respectively.

Presser mechanism 24 also includes a pair of pressers 44, 45 which act as a vice for multiple band sizing and repairing device 10. Pressers 44 and 45 include a pair of side sections 46, 47 of shoulders 26, 27, respectively. Side sections 46 and 47 include a pair of threaded presser receiver openings 48, 49 which extend therethrough, respectively. A pair of receiving threaded bolts 51, 52 of pressers 44 and 45 can be screwed through threaded presser receiver openings 48 and 49, respectively. The distal ends of bolts 51 and 52 have a pair of adjustment knobs 54, 55 which can be rotated to control reciprocating lateral movement of threaded bolts 51, 52 within presser receiving openings 48, 49.

Threaded bolts 51, 52 have hollow proximal ends which serve as a pair of bit/pin receptors 57, 58, respectively. Bit/pin receptors 57, 58 are operable for receiving a plurality of different type of presser bits 87 (described in detail below) for sizing and repairing bands and the like.

Protruding from top portion 14 of base 12 are four rectangular blocks 60, 61, 62 and 63 of varying size. Rectangular blocks 60, 61, 62 and 63 are separated by varying distances to form band holders 65, 66 and 67 of varying widths. Each band holder 65, 66 and 67 is operable for receiving and maintaining a band on its side (edge) between a pair of these rectangular blocks for sizing and repairing the band. The rectangular blocks serve as a vice to hold the band in place and inhibit movement in other than the direction of insertion within the band holder during sizing and repairing of the band.

In accordance with the invention, top portion 14 can include any number of rectangular blocks. The width of each band holder can be varied as desired. The quantity and size of the rectangular blocks and band holders depend on the size and shape of the bands to be repaired. In accordance with an alternative embodiment of the invention, adjustable rectangular blocks can be provided on top portion 14 to accommodate a wide range of band widths.

Figure 4:
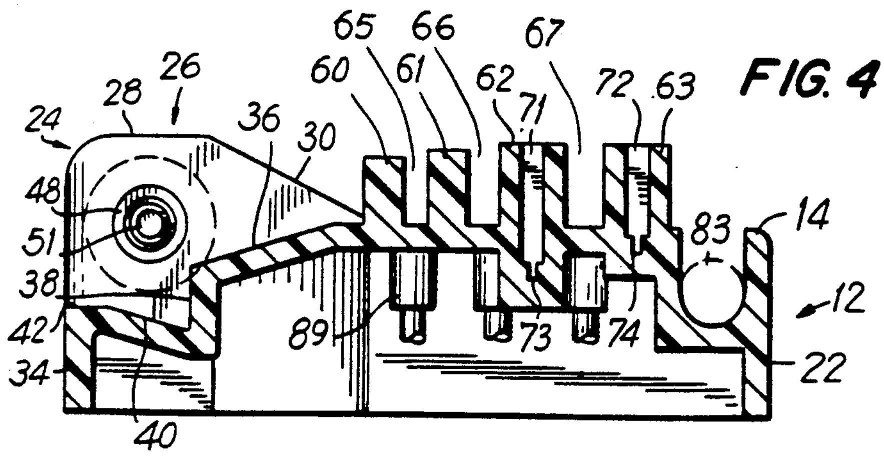
FIG. 4 is a cross-sectional view taken along lines 4—4 of FIG. 1.

Rectangular blocks 62, 63 include a pair of bit receptors 71, 72, respectively, for receiving a bit 69. Bit 69 has a male member at its bottom end and a tip at its top end. As shown in FIG. 4, bit receptors 71 and 72 include a pair of bit receptor locks 73 and 74, respectively. Bit 69 is inserted into either bit receptor 71 or bit receptor 72 depending on the type of band repair or sizing required as explained below. Bit 69 is inserted into bit receptor 71 or 72 until the male member locking engages bit receptor lock 73 or 74 so as to securely hold bit 69 within rectangular block 62 or 63, respectively.

Side portion 18 of base 12 includes a substantially cylindrical opening 83 and serves as a tool holder operable for receiving a tool 75 (e.g. a screwdriver). Tool 75 includes at one end a bit receptor 81, at intermediate portions a gripping portion 76 and a locking ring 77 and at the other end a rotatable top 79. Tool 75 is provided with a variety of bits, further discussed below, for insertion into bit recepter 81. For storage purposes, tool 75 is inserted into opening 83 when not in use as shown in FIGS. 22 and 23. Gripping portion 76 is centrally positioned along the major axis of tool 75 for greater control of tool 75 when operating on small items such as screws, pins and the like typically used in bands and other types of jewelry. A ruler 85, normally used for sizing, is provided on top portion 14 of base 12 near the edge bordering side portion 18.

Figure 2:
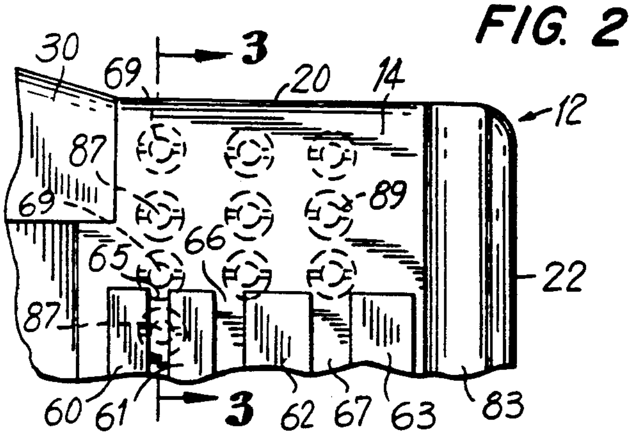
FIG. 2 is a fragmentary cross-sectional view along lines 2—2 of FIG. 1.
Figure 3:
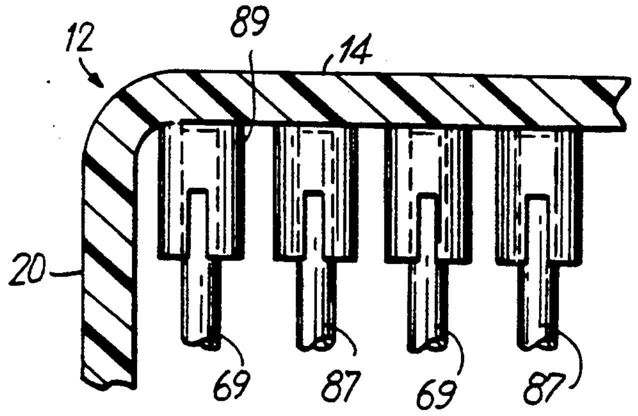
FIG. 3 is a fragmentary cross-sectional view taken along lines 3—3 of FIG. 2.

As shown in FIGS. 2 and 3, on bottom portion 16 of base 12, a plurality of holders 89 are provided. Bits 69 and presser bits 87 are inserted into holders 89 when not in use as shown in FIGS. 3 and 4. Preferably, ten holders 89 are provided on bottom portion 16. It is to be understood, however, that the number of holders 89 is not limited to ten 10) and can be of greater or lesser number as desired.

Reference is now made to FIGS. 5-14 which disclose six different embodiments of presser bit 87. Different presser bits 87 are shown in FIGS. 5, 6, 9, 11, 12 and 14. Presser bit 78 is generally formed with a body and a shank. Each shank typically includes a tip portion at the free (distal) end thereof. The bottom portion of the body is inserted into either bit/pin receptor 57 or 58 of threaded bolt 51 or 52, respectively. Operation of presser bit 87 in combination with threaded bolt 51 or 52 will be explained in greater detail below.

Figures 5, 6, 7, 8A, 8B, 8C, 9, 10:
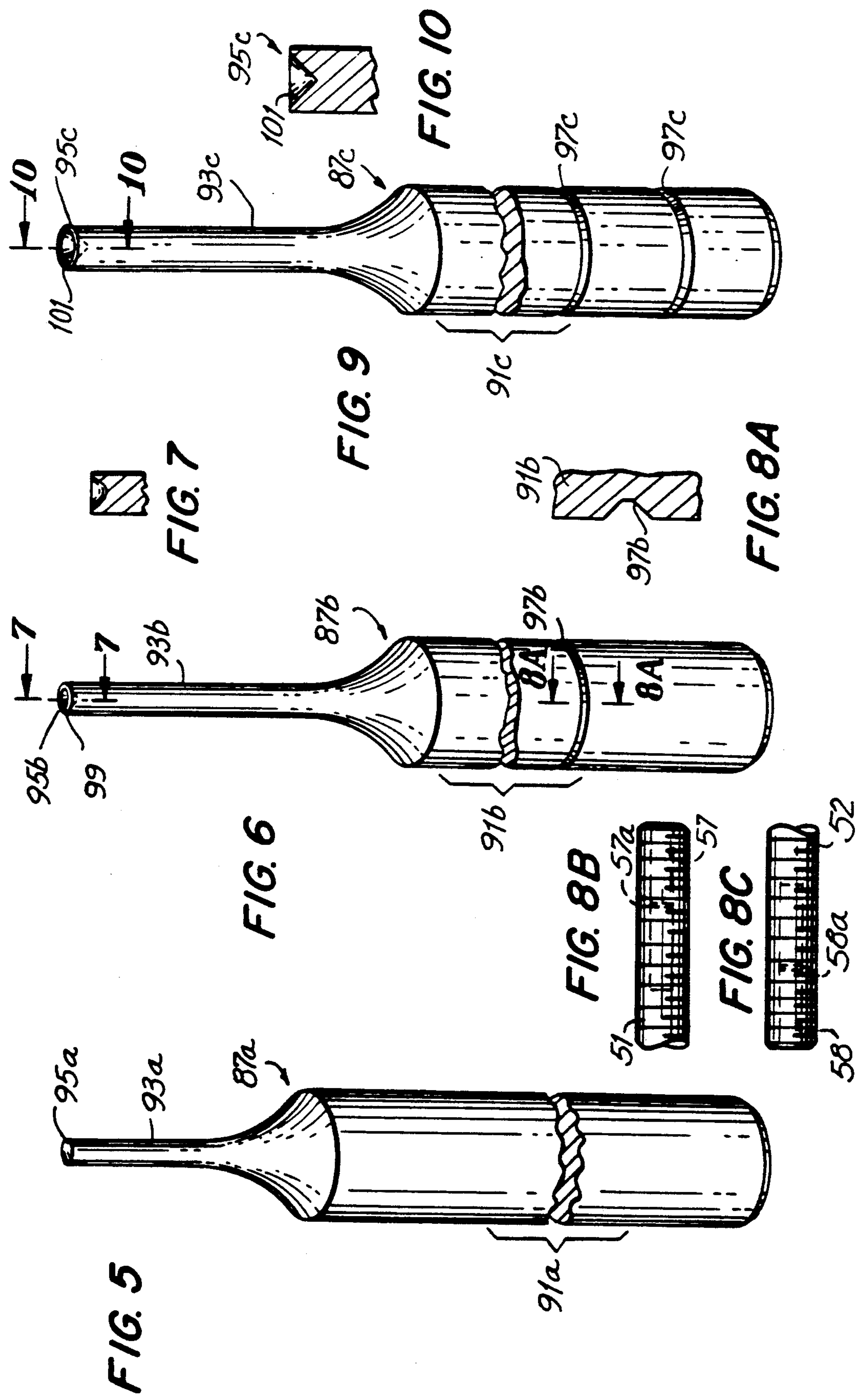
FIG. 5 is a perspective view of a presser bit in accordance with a first embodiment of the invention.
FIG. 6 is a perspective view of a presser bit in accordance with a second embodiment of the invention.
FIG. 7 is a fragmentary cross-sectional view taken along lines 7—7 of FIG. 6.
FIG. 8A is a fragmentary cross-sectional view taken along lines 8A—8A of FIG. 6.
FIGS. 8B and 8C are fragmentary elevational views of threaded bolts to be used with the presser bit of FIG. 6.
FIG. 9 is a perspective view of a presser bit in accordance with a third embodiment of the invention.
FIG. 10 is a fragmentary cross-sectional view taken along lines 10—10 of FIG. 9.

In accordance with a first presser bit embodiment, FIG. 5 illustrates a presser bit **87*a* having a body 91*a*, a shank 93*a* and a tip 95*a*. Tip 95*a*** is a thin cylindrical body used for driving a pin into or out from a band.

In accordance with a second presser bit embodiment, FIG. 6 illustrates a presser bit **87*b* having a body 91*b*, a shank 93*b* and a tip 95*b*. Tip 95*b* includes a rounded indented portion 99 as better shown in FIG. 7. As shown in FIGS. 8A, 8B and 8C, a locking groove 97*b* is provided on body 91*b* for locking engagement with a resilient circular protrusion 57*a* or a resilient circular protrusion 58*a* positioned within bit/pin receptor 57 or 58, respectively. More particularly, upon insertion of body 91*b* into bit/pin receptor 57 or 58, locking groove 97*b* mates with circular protrusion 57*a* or 58*a* whereby presser bit 87*b* is securely positioned within bit/pin receptor 57 or 58**, respectively.

In accordance with a third presser bit embodiment, FIG. 9 illustrates presser bit **87*c* having a body 91*c*, a shank 93*c* and a tip 95*c*. Tip 95*c* includes a conical indented portion 101 as better shown in FIG. 10. Body 91*c* is provided with two locking grooves 97*c*. Upon insertion of body 91*c* into bit/pin receptor 57 or 58, the first of locking groovers 97*c* farthest from shank 93*c* mates with circular protrusion 57*a* or 57*b* to securely position presser bit 87*c* within bit/pin receptor 57 or 58, respectively. Presser bit 87*c* can be further slid into bit/pin receptor 57 or 58 for mating the second of locking grooves 97*c* closest to shank 93 with circular protrusion 57*a* or 57*b*, respectively. Consequently, adjustment can be had in controlling the portion of presser bit 87*c* extending from and beyond thread bolt 51 or 52 depending on the desired function, respectively. Both presser bit 87*b* and presser bit 87*c* serve the same function as presser bit 87*a***, that is, for driving a pin into a band or the like.

Figure 11:
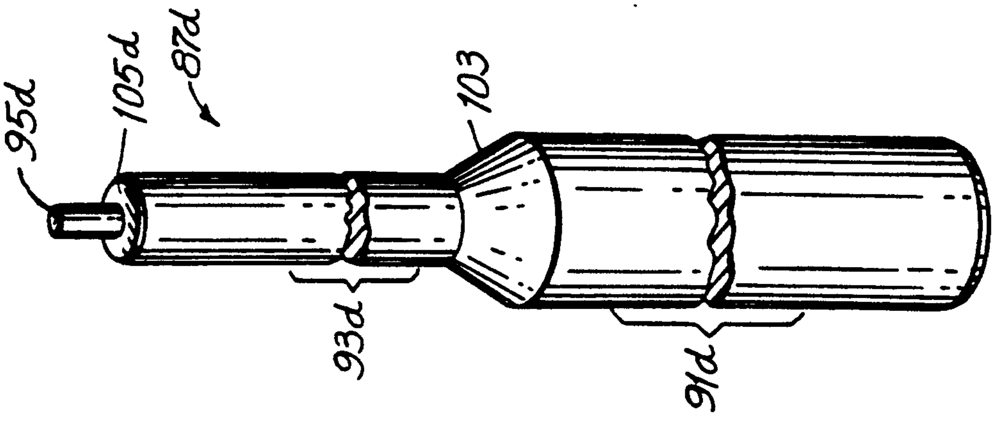
FIG. 11 is a perspective view of a presser bit in accordance with a fourth embodiment of the invention.

Similarly, in accordance with a fourth presser bit embodiment, FIG. 11 illustrates a presser bit **87*d* having a body 91*d*, a shank 93*d* and a tip 95*d*. A frustrum 103 integrally connects shank 93*d* to body 91*d*. The distal end of shank 93*d* includes a planar top 105*d* having a tip 95*d* protruding therefrom. Tip 95*d* has a thin cylindrical body. Presser bit 87*d*** is used for pressing against and pushing a pin or other like element out from a band.

Figure 12:
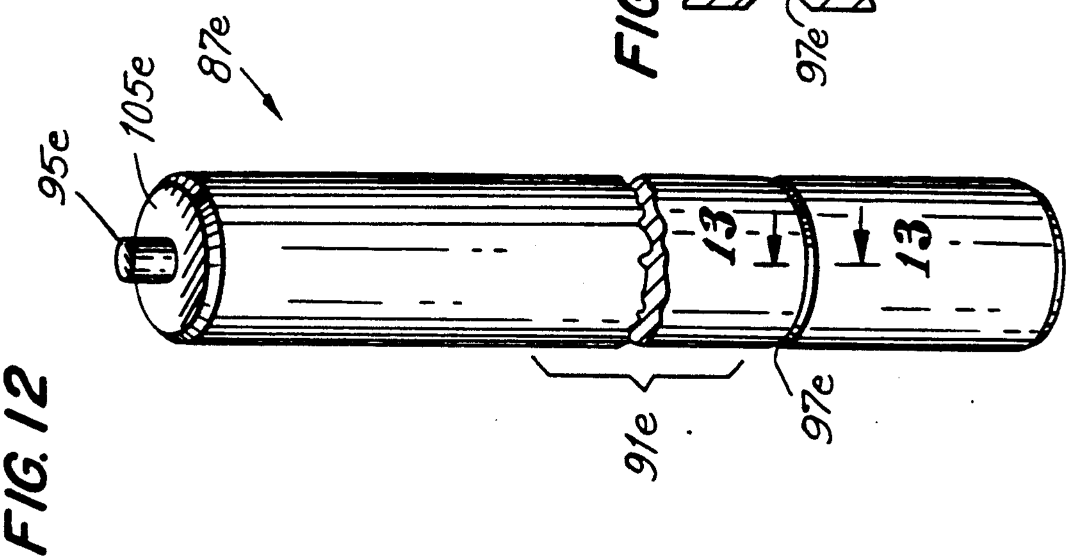
FIG. 12 is a perspective view of a presser bit in accordance with a fifth embodiment of the invention.

In accordance with a fifth presser bit embodiment, FIG. 12 illustrates a presser bit **87*e* having a body 91*e* and a tip 95*e*. Presser bit 87*e* does not include a shank portion. The distal end of body 91*e* includes a planar top 105*e* having a tip 95*e* protruding therefrom. The cylindrical body of tip 95*e* is wider (i.e., has a larger diameter) than the cylindrical body of tip 95*d*. A locking groove 97*e*, shown in FIGS. 12 and 13, similar to locking groove 97*b* of FIG. 7, for mating with circular protrusion 57*a* or 58*a* is provided at the lower portion of body 91*e***.

Figure 14:
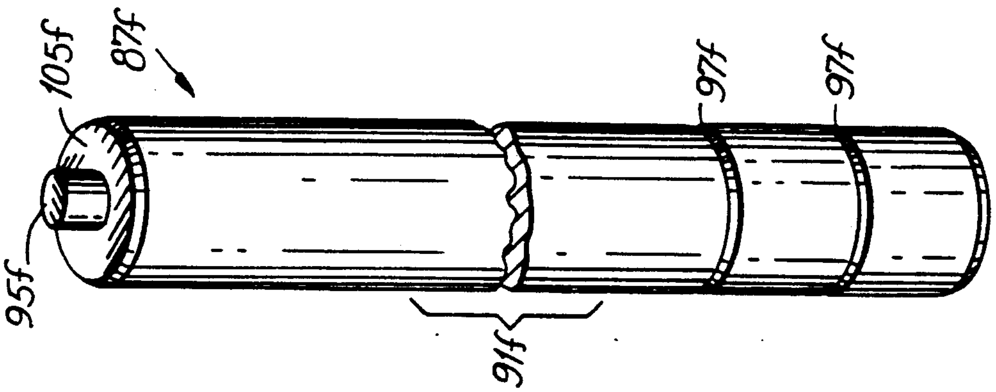
FIG. 14 is a perspective view of a presser bit in accordance with a sixth embodiment of the invention.
Figure 13:
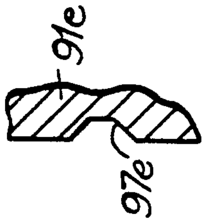
FIG. 13 is a cross-sectional view taken along lines 13—13 of FIG. 12.

In accordance with a sixth presser bit embodiment, FIG. 14 illustrates a presser bit **87*f*, similar to bit 87*e*, having a body 91*f* and a tip portion 95*f*. At the distal end of body 91*f* is a planar portion 105*f* having a tip 95*f* protruding therefrom. Tip 95*f* has a cylindrical body which is wider (i.e. a longer diameter) than both tips 95*d* and 95*e*. Similar to body 91*c* of FIG. 9, body 91*f* is provided with two locking grooves 97*f* to control the height of presser bit 97*f* when inserted into either bit/pin receptor 57 or 58**.

In accordance with the invention, any body, shank, tip, locking groove or frustrum shown in FIGS. 5, 6, 9, 11, 12 and 14 can be interchanged with any other similar part in forming a presser bit. As can be readily appreciated, other tips and bodies, shanks and locking mechanisms well known in the art also can be used in accordance with the invention provided the same can be used in combination with bit/pin receptor 57 or 58 in applying a driving force to push a bit/pin from a band or the like. It is also to be understood that each tool has a variety of functions, but most tools are used for either insertion or removal of a pin/bit from a band.

Four alternative embodiments of bit 69 are shown in FIGS. 15, 16, 17 and 18. Each bit 69 is typically provided with a shank, a tip and a male member and is operable for insertion into bit receptor 71 or 72 of rectangular blocks 62, 63, respectively. Each bit 69 is also operable for insertion into bit receptor 81 of tool 75. Bit 69 is inserted so that the male member thereof lockingly engages bit lock 73 or 74 of bit receptor 71 or 72, respectively. In tool 75, bit 69 is inserted into bit receptor 81. Locking ring 77 is then rotated to lock bit 69 in a desired position within tool 75.

In accordance with a first embodiment of bit 69, FIG. 15 illustrates a bit 69*a* having a shank 109*a* with a male member 113*a* at one end thereof. At the other end of shank 109*a* is a frustrum 117*a*. Frustrum 117*a* integrally connects and is positioned between a thin shank 115*a* having a planar top 114 and shank 109*a*. Shank 115*a* is used to drive/push a pin out from a band.

In accordance with a second embodiment of bit 69, FIG. 16 shows a bit 69*b* having a shank 109*b*, a male member 113*b* and a tip 111*b*. Tip 111*b* is constructed as a flat head screwdriver typically used for removing or inserting screws from a band.

In accordance with the third embodiment of bit 69, FIG. 17 illustrates a bit 69*c* having a shank 109*c*, a male member 113*c* and a tip 111*c*. The top portion of shank 109*c* has a frustrum 117*c* with the truncated end coupled to tip 111*e* through a thin shank 115*c*. Tip 111*c* is a flat head screwdriver tip which is both thinner and shorter than tip 111*b*. Bit 69*c* is typically used for inserting and removing tiny screws from a band.

In accordance with a fourth embodiment of bit 69, FIG. 18 illustrates a bit 69*d* having a shank 109*d*, a male member 113*d* and a tip 111*d*. Tip 111*d*, which is exaggerated and extends in a downwardly direction of shank 109*d*, has a triangular grove 119 cut out from tip 111*d*. Bit 69*d* is typically used for removing a cog from a bolt or to separate two objects connected to one another as shown in dashed lines in FIG. 18. In this embodiment, tip 111*d* and triangular groove 119 are inserted between a washer 123 which is coupled to a pin 121 and a watch body/case 125. Upon insertion of tip 111*d*, a prying action is used such that triangular groove 119 rests against pin 121 in pushing a washer 123 away from watch body/case 125.

Similar to presser bit 69, bit 87 may be constructed in a variety of sizes and shapes depending on the desired function. Accordingly, bit 87 is not limited to the designs disclosed herein.

Figure 19:
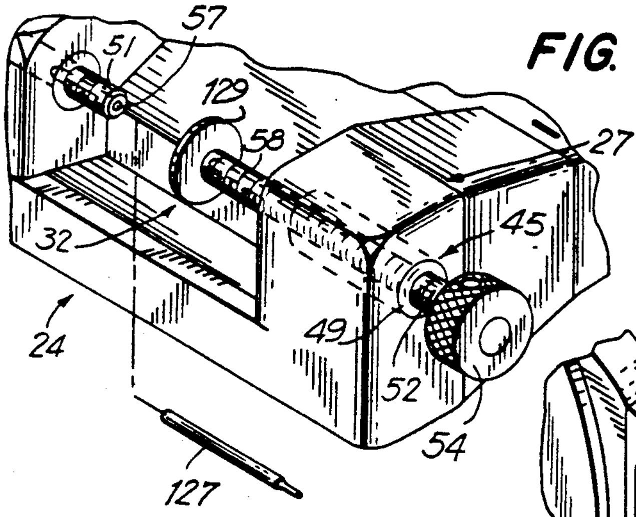
FIG. 19 is a fragmentary perspective view of presser mechanism in accordance with the invention.

Reference is now made to FIG. 19 which discloses the method in which multiple band sizing and repairing device 10 is used to reinsert a pin 127 into the band. It is extremely difficult to manipulate pin 127, which is relatively small, into a relatively tiny hole on the side of the band using conventional tools. Such manipulations, however, can be easily and simply undertaken in reinserting pin 127 by utilizing presser mechanism 24. A driving element 129 is inserted into bit/pin receptor 58. Driving element 129 has a relatively circular planar top portion and a thin shank (similar to body 91*b* of FIG. 6 or body 91*c* of FIG. 9) to lock into bit/pin receptor 57 or 58.

Pin 127 is then partially inserted into an opening for joining, for example, two links of the band together. The band having pin 127 partially inserted within and partially protruding therefrom is now positioned within gap 32 so that the side of the band from which the pin does not protrude is placed against threaded bolt 51 and the side of the band from which pin 127 partially protrudes is placed against driving element 129. Adjustment knob 54 is rotated so that driving element 129 moves toward and pushes against pin 127 to drive pin 127 into and completely through the opening joining the links of the band together. Once fully inserted, adjustment knob 54 is rotated in an opposite direction to move driving element 129 away from the band. The watch band can now be removed from gap 32.

Figure 20:
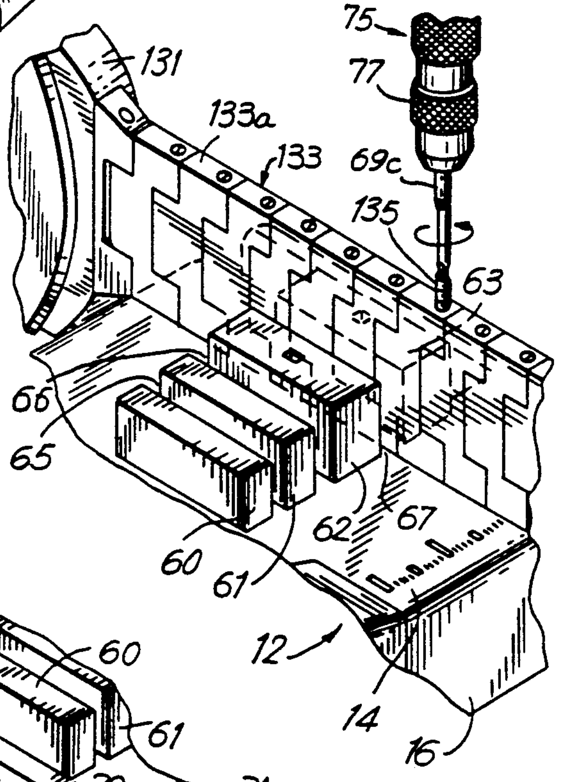
FIG. 20 is a fragmentary perspective view of a band holder in operation.

Reference is now made to FIG. 20 which illustrates a method for removing or attaching one of a plurality of links 133*a* from a band 133 in sizing or repairing the latter. Attaching or removing a link 133*a* requires insertion or removal of a screw or pin 135 from band 133. Band 133, connected to watch body/case 131, may be inserted into any one of band holders 65, 66 and 67 depending on the size and shape of the band. In this embodiment, band 133 is inserted into band holder 67 positioned between rectangular blocks 62 and 63. Band 133 slidingly fits within band holder 67 so that lateral movement is inhibited when band 133 is repaired or sized. Tool 75 with one of bits 69*a*, 69*b*, 69*c* and 69*d* inserted into bit receptor 81 is used to either insert or remove a screw 135 or to push down a spring loaded pin to lock the latter or to remove the latter from within link 133*a* of the band 133.

Figure 21:
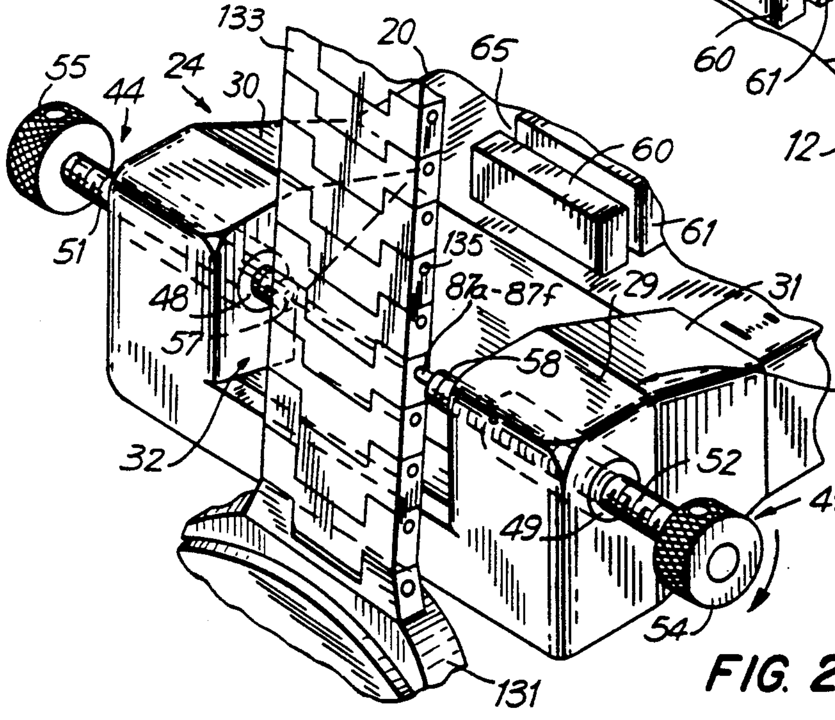
FIG. 21 is a fragmentary perspective of the presser mechanism in operation.

FIG. 21 illustrates a method for removal of a pin 135 from band 133 (or from watch body/case 131). In order to remove pin 135 from band 133, band 133 is placed within gap 32 so that one end rests against threaded bolt 51, and more particularly against the flat front surface of bit/pin receptor 57. The other side of band 133 is placed against threaded bolt 52, which has any one of presser bits 87*a*–87*f* inserted into bit/pin receptor 58. The size and shape of pin 135 determines which bit 87*a*–87*f* is inserted. Regardless of which bit is used, the method of removal is the same.

Once band 133 is placed between and engaged by presser 44 and presser 45, adjustment knob 54 of presser 45 is rotated to drive the tip portion of the selected bit through band 133 to push pin 135 into bit/pin receptor 57. Once pin 135 has been pushed into bit/pin receptor 57, adjustment knob 54 can be rotated in the opposite direction to remove bit 87 from band 135. Band 133 can now be repaired or sized as desired. Pin 135 thereafter can be reinserted by the method disclosed in FIG. 19.

If a pair of screws 136, 137 coupled to each other are used to connect band 33 to watch body 131, the embodiment disclosed in FIG. 22 is utilized. In order to attach or detach a watch band 135 from a band having two screws. A selected one of bits 69*a*–69*b* is inserted into bit receptor 72 (71) and detachably locked into bit lock 74 (73). One of tips 111*a*–111*d* corresponding to the selected one of bits 69*a*–69*d* then engages screw 136 to prevent rotation of screw 136 while screw 137 is being rotated by tool 75.

Tool 75 also has one of bits 69*a*–69*d* lockingly inserted into bit receptor 81. To remove screw 137 from body 131, tool 75 is rotated in first direction (e.g. counter clockwise). To reattach screw 137 to body 131, tool 75 is rotated in a direction opposite to the first direction (e.g. lockwise). In removing or attaching screw 137 to body 131, an operator uses his other hand to maintain engagement of the selected one of bits 69*a*–69*d* with screw 136. By providing bit receptor 71 or 72 on base 12, a band having two screws coupled to each other can be removed with far greater ease as compared to the conventional two screwdriver approach.

Reference is now made to FIGS. 23 and 24 which disclose operation of device 10 in removing a clip spring 141 from a band 137. Band 137 is formed by connecting a plurality of links 139 having a pipe-like shaped configuration. Links 139 are connected by inserting clip springs 141 into the hollow portions of links 139. Band 137 is laid on a flat surface 14*a* of top portion 14 and generally extends onto and beyond incline 31 and planar top 29. Band 137 is then pushed flush against rectangular blocks 60, 61, 62 and 63. One of the links 139 is aligned with one of the band holders 65, 66 and 67 so that spring clip 141 may be slid into the designated band holder during removal. A selected one of bits 69*a*–69*d* is lockingly inserted into tool 75. The selected bit locked into tool 75 is then pushed downwardly into an opening 140 of link 135 and forced towards the band holder which is aligned with link 139. Clip spring 141 is driven into band holder 67 between rectangular blocks 62 and 63. In this manner, spring 141 is removed so that necessary repair or sizing can be accommodated. To reassemble band 137, link 139 is realigned in front of any one of the band holders and the above procedure is reversed. After clip spring 141 has been reinserted, the selected bit locked within tool 75 must be pushed downwardly to lock clip spring 141 within link 139.

Referring now to FIGS. 25 and 26, cross-sectional views of tool 75 are provided. The selected one of male members 113*a*–113*d* is inserted into bit receptor 81 of tool 75 to lock the selected bit in position. Locking ring 77 is then twisted to secure the selected one of male members 113*a*–113*d* within bit receptor 81.

Device 10 is designed for repairing and sizing a large array of different band constructions quickly and easily. As can now be readily appreciated, device 10 avoids awkward manipulation of bands for insertion and removal of tiny pins and screws associated therewith.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of repairing and sizing a band having a first screw and a second screw which couple said band to a case, comprising the steps of:

inserting a proximal end of a bit into a base for securing said bit within said base;

engaging a distal end of said bit with said first screw to inhibit movement of said first screw; and rotating said second screw for one of detaching from and attaching to said band.

2. The method of claim 1, further including the step placing said band between walls rising from said base for holding said band along its edge.

3. A method of separating or connecting a pair of links of a band, said links when joined together being connected by a pin, comprising the steps of:

providing a base having a first shoulder and a second shoulder extending from said base and separated from each other so as to form a gap therebetween each shoulder having passage means for providing spatial communication through the shoulder wherein both passage means extend in the same direction;

inserting a first bolt through the passage means of the first shoulder and a second bolt through the passage means of the second shoulder so that said first bolt and second bolt extend in the same direction and are able to move in reciprocating directions;

placing said band between said bolts; and rotating said bolts in opposite reciprocating directions toward each other for pressing said first bolt against said pin to force said pin toward said second bolt so that said pin is removed from or inserted into said band.

4. The method of claim 3, wherein at least said second bolt has an inner end for receiving said pin and further including rotating said first bolt for forcing at least a portion of the pin into the inner end of said second bolt.

* * * * *